United States Patent
Smolders

(10) Patent No.: US 7,207,253 B2
(45) Date of Patent: Apr. 24, 2007

(54) PARACHUTE LINE CUTTING DEVICE

(75) Inventor: Jo Smolders, Wespelaar (BE)

(73) Assignees: B & B Controls, Brussels (BE); Socofimmo Holding S.A., Luxembourg (LU)

( * ) Notice: Subject to any disclaimer, the term of this patent is extended or adjusted under 35 U.S.C. 154(b) by 74 days.

(21) Appl. No.: 10/915,595

(22) Filed: Aug. 11, 2004

(65) Prior Publication Data
US 2005/0060892 A1  Mar. 24, 2005

(30) Foreign Application Priority Data
Aug. 11, 2003  (EP) ................................. 03077538

(51) Int. Cl.
*A26D 5/12* (2006.01)
(52) U.S. Cl. ............... 89/1.14; 244/151 B; 114/221 A; 83/639.4
(58) Field of Classification Search ................. 89/1.14; 244/151 B; 83/639.4, 580; 114/221 A
See application file for complete search history.

(56) References Cited

U.S. PATENT DOCUMENTS

| | | | | |
|---|---|---|---|---|
| 2,768,802 | A | | 10/1956 | Dejean |
| 2,924,147 | A | | 2/1960 | Bohl et al. |
| 2,926,565 | A | | 3/1960 | Thorness et al. |
| 2,942,818 | A | * | 6/1960 | Stott ........................... 244/150 |
| 3,482,484 | A | * | 12/1969 | Brizzolara ..................... 89/1.1 |
| 3,885,484 | A | * | 5/1975 | Sturgis ........................ 83/580 |
| 3,895,552 | A | * | 7/1975 | Lagofun ...................... 83/580 |
| 3,991,679 | A | | 11/1976 | Savitt et al. |
| 4,062,112 | A | * | 12/1977 | Lake ............................ 30/228 |
| 4,493,240 | A | * | 1/1985 | Norton ........................ 89/1.14 |
| 4,517,895 | A | * | 5/1985 | Rucker ..................... 102/202.2 |
| 4,860,698 | A | * | 8/1989 | Patrichi et al. ........... 123/24 R |
| 5,036,588 | A | * | 8/1991 | Cherry ......................... 30/180 |
| 5,177,317 | A | * | 1/1993 | Walker et al. ............... 89/1.14 |
| 5,703,315 | A | * | 12/1997 | Coggan ....................... 89/1.14 |

FOREIGN PATENT DOCUMENTS

| | | |
|---|---|---|
| DE | 19709316 A1 | 11/1997 |
| GB | 516869 | 1/1940 |

* cited by examiner

*Primary Examiner*—Michael J. Carone
*Assistant Examiner*—Susan C. Alimenti
(74) *Attorney, Agent, or Firm*—Akerman Senterfitt; Jerold I. Schneider

(57) ABSTRACT

The present invention is to improve the mechanical characteristics of a pyrotechnical parachute line cutting device. By enforcing the mechanical traction on the electrical connection wire by Kevlar reinforcement cords. The flexible electrical wire will be connected straight to the propellant detonator to avoid wire connections and fix the detonator trigger straight on the flexible wire. The reefing line will be cut by the blade but also, to secure the cutting action, be melt in the head of the cutter blade after explosion due to the use of special knife material size and an adapted pyrotechnical charge.

10 Claims, 3 Drawing Sheets

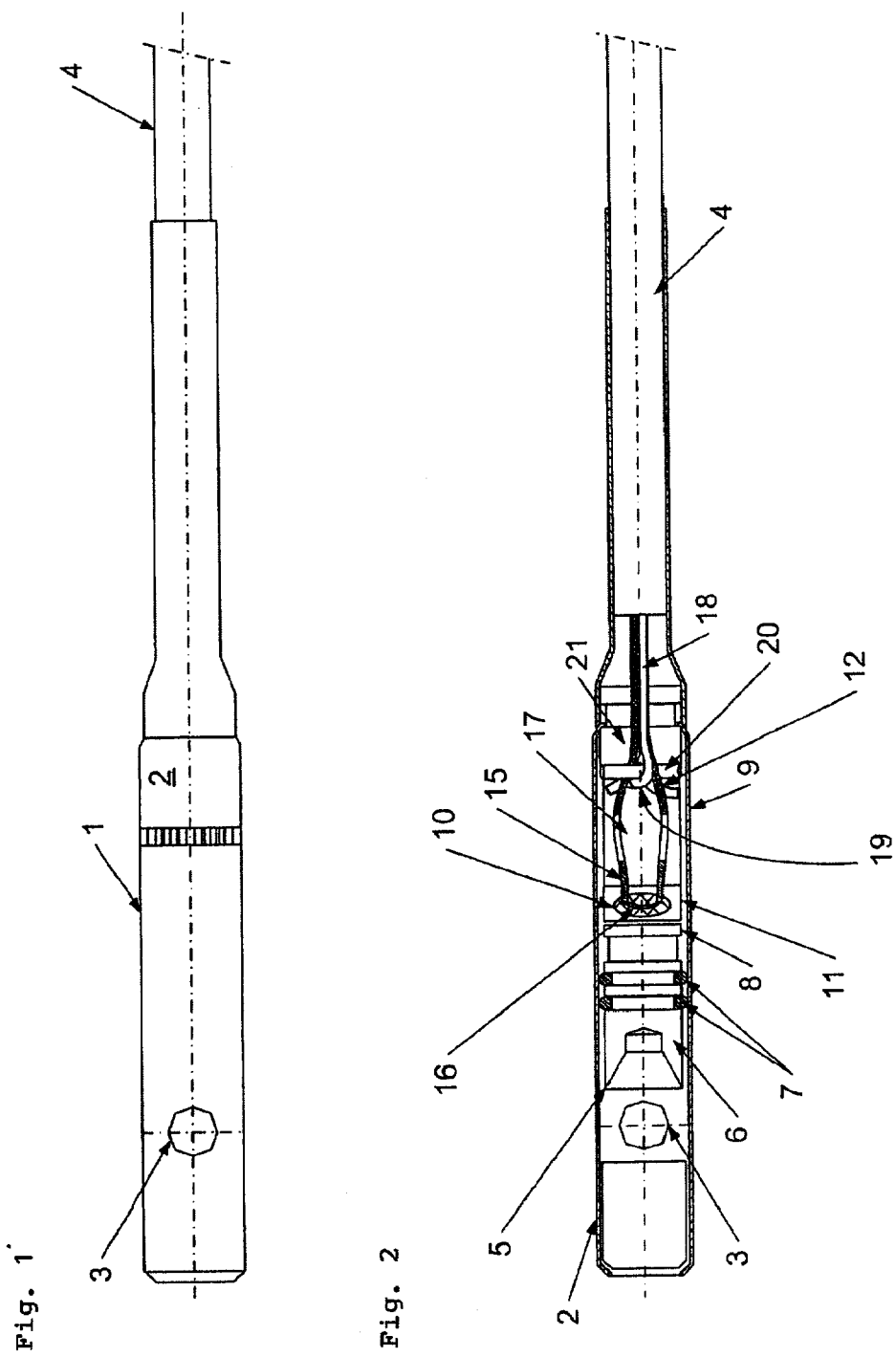

PARACHUTE LINE CUTTING DEVICE

The present invention relates to a parachute line cutting device comprising a cutter member mounted inside a first housing having an opening providing a passage for said parachute line, said cutting device further comprising a firing element provided for projecting said cutter member towards said line after having been ignited in order to cut the latter, said firing element being connected to flexible electrical wires which are themselves connectable to a power supply source. More particularly, the present invention concerns pyrotechnically actuated explosive line cutters.

Explosive line cutters have been known for many years. These devices are particularly useful, for example, in the staged deployment of parachutes. The main parachute is deployed in stages, which stages are controlled by reefing lines. A line cutter is a useful device to permit reefing lines to be severed sequentially during staged deployment and also to effect engagement of a reserve chute if a main chute didn't open where necessary. Thus, it is particularly important that the line cutting devices be highly reliable. A typical line cutting device includes an anvil and a cutter member which is movable toward the anvil, but spaced therefrom by a distance which permits the line to be severed to pass there between. The cutter member is typically propelled by a conventional explosive actuator assembly, which may include a primer, a delay charge and an explosive charge. Typically, such line cutters are actuated by pyrotechnical charge.

In the known devices the cutter member is projected towards the line after ignition of the firing element. When use is made of explosive cutters, the explosive material in the firing element is ignited by means of an electrical discharge. To this purpose electrical wires connect the firing element with a power supply source. Such a line cutting device is for example illustrated in U.S. Pat. No. 3,991,679 issued to Patrichi and in U.S. Pat. No. 2,924,147 issued to Bohl et al.

In use the line cutting device is exposed to mechanical strength and it must also be able to operate reliably through a wide range of altitudes, pressures, temperatures, humidity and traction conditions. To the extent that those parameters can affect a pyrotechnically actuated device, measures must be taken to reduce any adverse effects resulting from variations in those parameters. In addition, since a line cutting device is often associated with the deployment of a parachute it will also be appreciated that a line cutting device must stay very reliable.

Different types of devices have also been proposed for explosively destroying part of a line rather than cutting the line. For example, it has been proposed to use an explosive charge which is embedded in a braided rope or cable and connected to an igniting device may, for example, including a fulminating compound surrounding a barbed wire, which compound is fired when the barbed wire is withdrawn. Such a destructible link device is shown, for example, in U.S. Pat. No. 2,768,802 issued to Dejean.

A drawback of the known devices is that a high mechanical force is applied on the electric wires, which could lead to a mechanical rupture of the electrical connection and thus to a malfunctioning of the firing element, thus leading to an inaccurate line cutting.

It is an object of the present invention to realise a parachute line cutting device where less mechanical force is applied on the electrical wires.

For this purpose a parachute line cutting device according to the invention is characterised in that said wires are surrounded by at least one strengthening cord made of a material which is less elastic than said wires, said strengthening cord being fixed to a second housing wherein said firing element is lodged. In such a manner the mechanical force is mainly applied on the strengthening cord since the latter is lees elastic than the wire. The wires feel much less the force and remain therefor connected to the firing element.

A first preferred embodiment of a parachute line cutting device according to the invention is characterised in that the cord(s) are knotted around a rigid pin, in particular made of stainless steel, lodged in a location adapted within the second housing. This enables a reliable connection between cord and second housing.

A second preferred embodiment of a parachute line cutting device according to the invention is characterised in that the flexible electrical wires are solidified at their end located inside said second housing in order to form a stiff portion to which a fine wire bridge is electrically bonded. This will permit both attachment of the fine wire directly to each electrical wire and application of the spot charge. The advantage of this technique is the avoidance of any intermediate connections between the control device and the spot charge.

A third preferred embodiment of a parachute line cutting device according to the invention is characterised in that said line is made of meltable material and wherein said firing element is provided to produce upon ignition sufficient heat in order to melt a section of said line. The cut middle portion of the line will also be melted if not completely cut due to the high temperature of the cutter member obtained after the explosion of a pyrotechnic charge to increase the temperature and due to the adapted size and shape of the security blade to secure cutting action.

The invention will now be described in more details with reference to the annexed drawings illustrating a preferred embodiment of a parachute line cutting device according to the invention. In the drawings:

FIG. 1 shows an overall view of a line cutting device according to the invention;

FIG. 2 shows the inside of a line cutting device according to the invention;

In the drawings a same reference number has been assigned to a same or analogous element.

Figure 3:
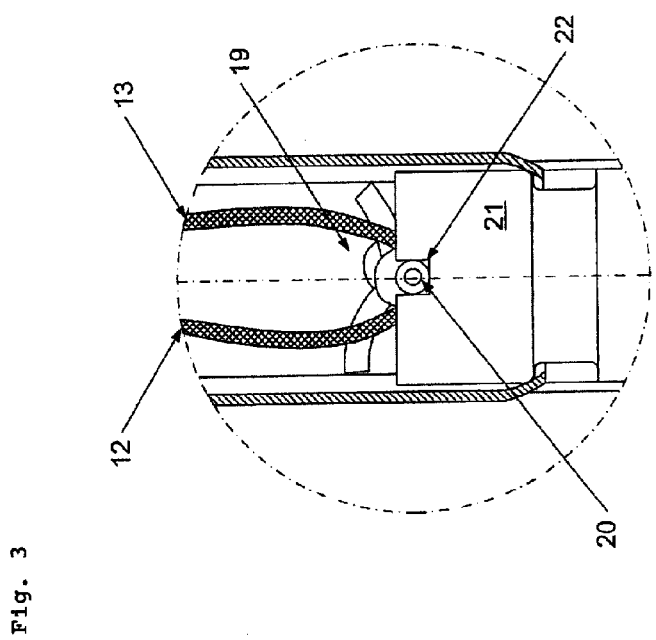
FIG. 3 shows a detailed view how the cord is applied on the second housing.

The parachute line cutting device 1 according to the invention and illustrated in FIG. 1 comprises a first housing 2 having an opening 3 provided for the passage of the line (not shown) to be cut. A flexible shielded cable 4, leaving the first housing 2, comprises electrical wires leading to a power supply source (not shown).

Inside the first housing, as illustrated in FIG. 2, a cutter member 5 is lodged. The front end of the cutter member 5 is situated near the opening 3 in such a manner that the cutter member 5 is near the line crossing the opening 3. Preferably the cutter member 5 has a circular cutter blade and is conically shaped. This enables to cut the line at two different places. The cutter member 5 is formed as the front end of a pen 6 around which two sealing O-rings 7 are wrapped. A smooth movement of the cutter member 5 inside the first housing 2 is thus obtained.

Figure 4:
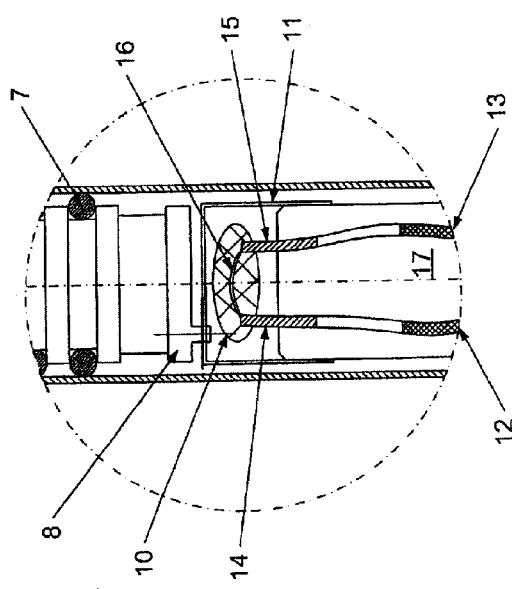
FIG. 4 shows a detailed view of the firing element.

As is further illustrated in FIG. 4, a back end 8 of the pen 6 faces a front end of a second housing 9 mounted inside the first housing 2. The second housing 9 lodges a firing element 10, which is protected by a cap 11. The firing element 10 is preferably made of pyrotechnic material. The composition of the pyrotechnic material determines the air volume produced due the explosion in the device 1 and the heat produced of the latter material and thus also the heat transferred to the cutter member 5.

Two flexible electrical wires 12 and 13 penetrate inside the second housing 9 and extend up to the volume covered by the cap 11. Those wires 12, 13 supply the electric power to the firing element 10 in order to ignite the latter. The wires 12, 13 are solidified at their ends 14 and 15 located inside the cap 11. In such a manner the solidified ends 14, 15 form a stiff portion to which a fine wire bridge 16, forming a fuse head, is electrically bonded. This set-up is comparable to the one used in electric light bulbs. The solidification of the wire ends 14, 15 is for example realised by fuse head welding of the multi thread wire ends. The application of the fine wire bridge 16 to the wire ends 14, 15 is preferably realised by spot welding.

The stiff portion as well as a part of the wires 12, 13 is molded within a rigidifying material 17 and the solidified ends 14 and 15 extend slightly beyond the molded rigidifying material 17. In such a manner they from the electrodes to which the fine wire bridge 16 is spot weld. The rigidifying material 17 is preferably formed by epoxy or rubber.

As illustrated in FIG. 3, the second housing 9 is provided with a locking member 21 applied at the opposite end of the one to which the cap 11 is applied. The locking member 21 is substantially cylindrically shaped and provided with a diagonally extending recess 22 applied at a front end thereof. A rigid pin 20, preferably made of stainless steel, is lodged into said recess 22. The locking member 21 is provided with a front and a back opening in order to enable the passage of the wires 12 and 13. At least one strengthening cord 18 (FIG. 2) surrounds the wires 12 and 13. The strengthening cord 18 is made of a material which is less elastic than the one of which the wires 12, 13 are made. Preferably the cord 18 is made of Kevlar (a registered trademark of Dupont de Nemours).

The strengthening cord 18 is fixed to the second housing 9 by means of the pin 20. To this purpose the cord end is knotted (illustrated by knot 19) around the pin 20, thereby attaching the cord 18 to the locking member 21 since the pin 20 is lodged in the recess 22. When now a mechanical force or tension is applied on cable 4, for example on ignition of the firing element 10, the majority of the force or tension will be picked up by the cord 18 since the latter is less elastic than the wires 12 and 13. The latter will feel nearly no force or tension, thereby reducing the risk to destroy the electrical connection with the firing element 10. A major part of the force or tension is picked up by the cord 18 and exerted on the pin 20.

The cord end and the knot 19 are also preferably molded in the rigidifying material 17. An entity of cord and wires inside the second housing 9 is thereby obtained.

Preferably said line is made of meltable material such as for example Dacron (a registered trademark of Dupont de Nemours)). As already mentioned said firing element 10 is provided to produce upon ignition sufficient heat in order to melt a section of said line. Indeed with a suitable choice of the material of which the line is made and with an adapted choice of the pyrotechnic material, sufficient heat can be produced to melt the line. The small dimension of the cutter member 5 will accumulate the heat in the cutter member 5 in order to supply sufficient heat to also melt the line, thereby improving the cutting process and thus the reliability of the device 1. By using a cylindrical cutter blade the line is cut at two places and this double cut, combined with a melt of the material, perfectly co-operate. The conical shape of the cutter member 5 is dimensioned to form a receptacle of sufficient dimension for receiving the melted line section.

The invention claimed is:

1. A parachute line cutting device comprising a cutter member mounted inside a first housing having an opening providing a passage for said parachute line, said cutting device further comprising a firing element provided for projecting said cutter member towards said line after having been ignited in order to cut the latter, said firing element being connected to flexible electrical wires which are themselves connectable to a power supply source, characterized in that said wires are surrounded by at least one strengthening cord made of a material which is less elastic than said wires, said strengthening cord being fixed to a second housing wherein said firing element is lodged.

2. A parachute line cutting device as claimed in claim 1, characterized in that the cord(s) are knotted around a rigid pin, in particular made of stainless steel, lodged in a recess adapted within the second housing.

3. A parachute line cutting device as claimed in claim 1, characterized in that the flexible electrical wires are solidified at their end located inside said second housing in order to form a stiff portion to which a fine wire bridge is electrically bonded.

4. A parachute line cutting device as claimed in claim 2, characterized in that the flexible electrical wires are solidified at their end located inside said second housing in order to form a stiff portion to which a fine wire bridge is electrically bonded.

5. A parachute line cutting device as claimed in claim 3, characterized in that said stiff portion is molded within a rigidifying material, in particular epoxy or rubber, and wherein the solidified wire ends extend slightly beyond the molded rigidifying material.

6. A parachute line cutting device as claimed in claim 1, characterized in that said line is made of meltable material and wherein said firing element is provided to produce upon ignition sufficient heat in order to melt a section of said line.

7. A parachute line cutting device as claimed in claim 2, characterized in that said line is made of meltable material and wherein said firing element is provided to produce upon ignition sufficient heat in order to melt a section of said line.

8. A parachute line cutting device as claimed in claim 3, characterized in that said line is made of meltable material and wherein said firing element is provided to produce upon ignition sufficient heat in order to melt a section of said line.

9. A parachute line cutting device as claimed in claim 4, characterized in that said line is made of meltable material and wherein said firing element is provided to produce upon ignition sufficient heat in order to melt a section of said line.

10. A parachute line cutting device as claimed in claim 6, characterized in that said cutter member is provided for applying a double-cut to said line.

* * * * *